(12) United States Patent
Brandys

(10) Patent No.: US 7,188,362 B2
(45) Date of Patent: Mar. 6, 2007

(54) SYSTEM AND METHOD OF USER AND DATA VERIFICATION

(75) Inventor: Pascal Brandys, Del Mar, CA (US)

(73) Assignee: Pascal Brandys, Del Mar, CA (US)

( * ) Notice: Subject to any disclaimer, the term of this patent is extended or adjusted under 35 U.S.C. 154(b) by 924 days.

(21) Appl. No.: 10/096,416

(22) Filed: Mar. 11, 2002

(65) Prior Publication Data

US 2002/0186838 A1 Dec. 12, 2002

Related U.S. Application Data

(60) Provisional application No. 60/274,518, filed on Mar. 9, 2001.

(51) Int. Cl.
  G06F 7/04 (2006.01)
  G06F 17/30 (2006.01)
  G06F 9/00 (2006.01)
  G06F 1/68 (2006.01)
  G06F 1/00 (2006.01)
  H04K 1/00 (2006.01)
  H04L 9/00 (2006.01)
  H04L 9/32 (2006.01)

(52) U.S. Cl. ........................ 726/9; 713/185; 713/186; 713/193; 713/194; 726/20; 726/28; 726/29; 726/30

(58) Field of Classification Search ............... None
See application file for complete search history.

(56) References Cited

U.S. PATENT DOCUMENTS 4,453,074 A 6/1984 Weinstein
5,485,519 A * 1/1996 Weiss ..................... 713/185
5,541,994 A * 7/1996 Tomko et al. ............. 380/30
5,764,789 A 6/1998 Pare, Jr. et al.

(Continued)

FOREIGN PATENT DOCUMENTS

DE 199 22 946 A1 11/2000

(Continued)

OTHER PUBLICATIONS

Smart Card (Microsoft Corporation, Mar. 1999)*

(Continued)

Primary Examiner—Ayaz Sheikh
Assistant Examiner—Longbit Chai
(74) Attorney, Agent, or Firm—Knobbe, Martens, Olson & Bear, LLP

(57) ABSTRACT

A system and method of authenticating users and data. One embodiment of the invention includes a smart card that digitally signs a message in response to authenticating biometric information that is provided by a user. The smart card may include a random number generator and an encryption module. In an enrollment mode, the biometric data analyzer receives biometric data from a user and triggers the random number generator to create a public key and a private key. The private key is stored in a tamper-resistant component on the smart card. The public key is transmitted to an external device, such as a computer, via a card reader interface. During a signing mode, the smart card digitally signs incoming messages subsequent to verifying the biometric information that is provided by the user.

4 Claims, 5 Drawing Sheets

U.S. PATENT DOCUMENTS

| | | | |
|---|---|---|---|
| 5,768,389 A | 6/1998 | Ishii | |
| 5,838,812 A | 11/1998 | Pare, Jr. et al. | |
| 5,870,723 A | 2/1999 | Pare, Jr. et al. | |
| 5,910,989 A | 6/1999 | Naccache | |
| 5,991,408 A * | 11/1999 | Pearson et al. | 713/186 |
| 6,011,858 A * | 1/2000 | Stock et al. | 382/115 |
| 6,012,039 A | 1/2000 | Hoffman et al. | |
| 6,101,477 A | 8/2000 | Hohle et al. | |
| 6,154,879 A | 11/2000 | Pare, Jr. et al. | |
| 6,192,142 B1 | 2/2001 | Pare, Jr. et al. | |
| 6,230,148 B1 | 5/2001 | Pare, Jr. et al. | |
| 6,269,348 B1 | 7/2001 | Pare, Jr. et al. | |
| 6,484,260 B1 * | 11/2002 | Scott et al. | 713/186 |
| 2002/0095587 A1 * | 7/2002 | Doyle et al. | 713/186 |

FOREIGN PATENT DOCUMENTS

| | | |
|---|---|---|
| WO | WO 98/39876 | 9/1998 |
| WO | WO 00/65770 | 11/2000 |
| WO | WO 01/16871 A1 | 3/2001 |

OTHER PUBLICATIONS

Seiffert, "Biometrische Verfahren," Nachrichtentechnik Elektronik, Veb Verlag Technik, vol. 48, No. 6, pp. 13-15, Nov. 1998.

* cited by examiner

SYSTEM AND METHOD OF USER AND DATA VERIFICATION

RELATED APPLICATION

This application claims the benefit of and incorporates by reference, in its entirety, U.S. Provisional Application No. 60/274,518, filed Mar. 9, 2001.

BACKGROUND OF THE INVENTION

1. Field of the Invention

The invention relates to the conversion of physical or biological signatures into digital signatures. More particularly, the invention relates to generating digital signatures using biometric identification.

2. Description of the Related Technology

Physical signatures are becoming an anachronism in the electronic world and the process of verifying pen-and-ink signatures, photographs or fingerprints on paper or other materials are costly and error-prone. At least with physical documents, however, the signer retains the basic "contextual controls" of document preparation and physical delivery. On a digitally signed electronic document, on the other hand, a signer controls only the encoded signature. All time, place and manner controls are absent, and nothing distinguishes a valid user signature from one fraudulently produced by another user who somehow obtained the first user's data, algorithms and keys.

Public-key cryptography is a computer security technology that can support the creation of electronic document systems, providing that the user's digital signature on an electronic document, i.e., the user's electronic authentication and verification of the electronic document, can be given sufficient practical and legal meaning.

These systems have enormous commercial significance because, in many cases, large cost reductions can be realized over current paper transaction procedures. This improvement is sufficiently dramatic that many organizations are, for economic and competitive reasons, compelled to use them once their practicality has been demonstrated.

Disadvantageously, known systems do not allow for authentication of messages using biometric information. Biometrics is the measure of an individual's body or behavior in order to identify or verify the individual's identity. Biometrics provides for new ways to identify a user with his fingerprint, voiceprint, iris scan, facial picture, hand geometry or various other unique features of his body or behavior. Biometric measurement data, albeit subject to statistical variations, is nevertheless conventionally used to verify the identity of individuals. Typical methods used are based on statistical hypothesis testing where an individual's biometric measurements are stored at the time of "enrollment". Then, during "verification", biometric measurements are taken again and compared to the stored measurements. Various algorithms can be used to convert the measurements into mathematical representations and accept a range of biometric data. This conversion and statistical analysis is useful because sequential biometric measurements have a range for any one individual, especially when taken at different times and places using even slightly different equipment.

There is a need for new and improved systems for authenticating messages. The system should analyze biometric information as provided by the user as part of the authentication process. The system should also include features to safeguard the keys that are used in the authentication process.

SUMMARY OF THE CERTAIN INVENTIVE ASPECTS

One aspect of the invention comprises a method of generating digital signature, the method comprising: generating public and private keys on a secure device, storing biometric information indicative of a user on the secure device, receiving biometric information indicative of the user, and comparing the stored biometric information with the received biometric information on the secure device, and if the comparison is successful, generating a digital signature for a message. In one embodiment, the secure device is portable. Furthermore, in one embodiment of the invention, the secure device is a smart card.

Another aspect of the invention comprises a method of generating a digital signature, the method comprising registering biometric information in a secure device and generating public and private keys on the secure device in conjunction with the biometric information. The digital device may include a unique device identifier which is used for key generation.

Yet another aspect of the invention comprises a secure device for generating a digital signature, the device comprising: a module for generating public and private keys on a secure device, a module for storing biometric information indicative of a user on the secure device, a module for receiving biometric information indicative of the user, and a module for comparing the stored biometric information with the received biometric information on the secure device, and if the comparison is successful, generating a digital signature for a message.

DETAILED DESCRIPTION OF EMBODIMENTS OF THE INVENTION

The following detailed description is directed to certain specific embodiments of the invention. However, the invention can be embodied in a multitude of different ways as defined and covered by the claims.

Figure 1:
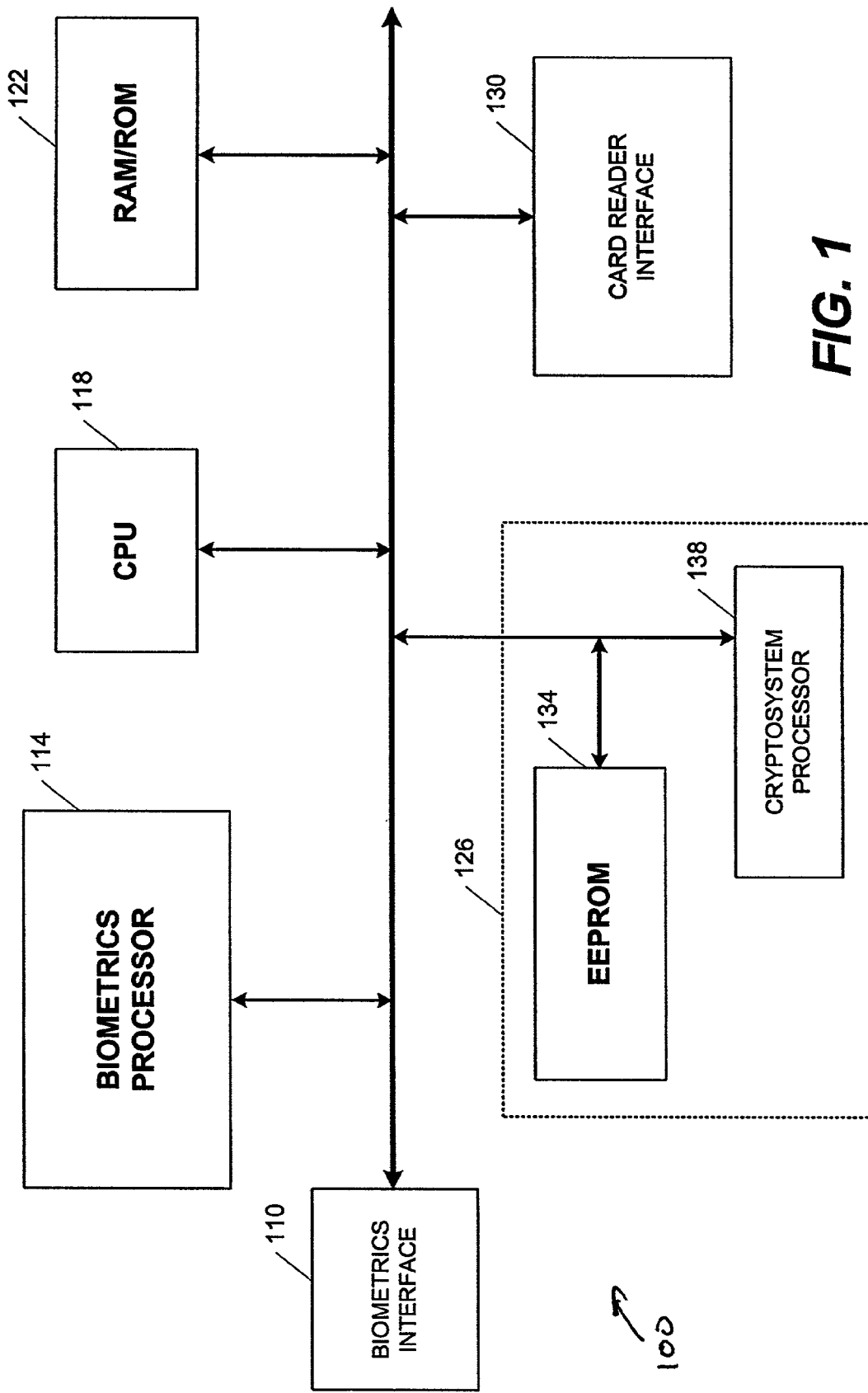
FIG. 1 is a block diagram illustrating certain components of a smart card embodiment of a portable encryption device.

FIG. 1 illustrates an exemplary smart card 100 that may be used to verify biometric information and sign a data item. Although the following text describes the use of a smart card 100, the processes that are performed by the smart card 100 can be integrated with any type of portable electronic device, for example a wireless handheld device. Furthermore, it is noted that the portable electronic device can comprise software, hardware, or a combination thereof. The smart card 100 receives the biometric information via a biometrics interface 110 and then processes the biometric information with a biometrics processor 114. The smart card 100 also includes a central processing unit (CPU) 118, a random access memory/read only memory (RAM/ROM) 122, a cryptosystem 126, and a card reader interface 130. The cryptosystem 126 may include an electrically eraseable programmable read only memory (EEPROM) 134 and a cryptosystem processor 138. The EEPROM 134 may contain a unique identifier, e.g., card serial number, associated with the smart card 100 which may be used in key generation. These various components may communicate over a shared bus. It is noted that, depending on the embodiment, other hardware configurations may be used. For example, in one embodiment, the biometrics processor 114, the CPU 118, and the cryptosystem processor 138 can be integrated into a single processor.

Figure 2:
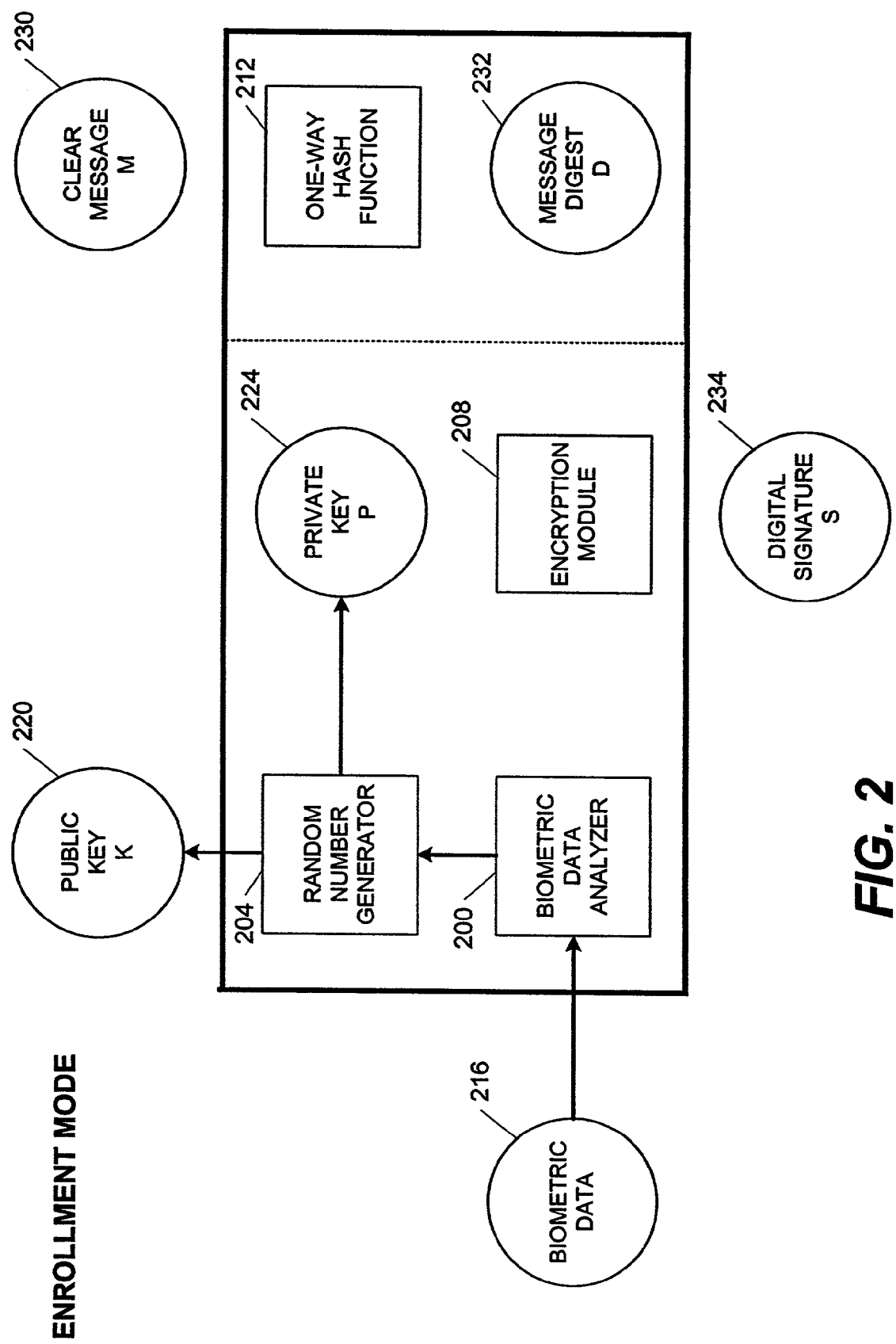
FIG. 2 is a block diagram illustrating the functional modules and data involved in an enrollment process that is performed by the smart card of FIG. 1.

FIG. 2 is a block diagram illustrating the process flow of the smart card 100 during an enrollment mode. FIG. 2 also illustrates certain functionalities that may be embodied as software modules that are executed by the hardware shown in FIG. 1. Insofar as functionality, the smart card 100 comprises a biometric data analyzer 200, a random number generator 204, an encryption module 208, and a one-way hash function 212. The biometric data analyzer 200, the random number generator 204, the encryption module 208 and the one-way hash function 212 may be implemented in either hardware or software. In one embodiment, the biometric data analyzer 200 is associated with the biometrics processor 114 and functions 204, 208 and 212 are associated with the cryptosystem 138.

In one embodiment of the invention, the biometric data analyzer 200 executes on the biometrics processor 114 (FIG. 1). In the enrollment mode, the biometric data analyzer 200 receives biometric data 216 from a user and triggers the random number generator 204 to create a public key 220 and a private key 224. The private key 224 is stored in a tamper-resistant component on the smart card 100. The public key is transmitted to an external device, such as a computer, via the card reader interface 130.

In one embodiment, once a set of biometric parameters is selected, a graphical distribution of identifications is made in n-dimensions. Registration is conducted against known templates in dependence upon the selected parameters.

Once registration is complete, a single point is determined having coordinates equal to each of at least some of the registration results. Alternatively, the point has coordinates determined in dependence upon the registration results but not equal thereto. Plotting the point results in a point plotted in n-dimensional space. The biometrics processor 114 then determines a probability distribution for the selected parameters. Alternatively, this is performed prior to the registration process for biometric information samples. Further, alternatively the probability distributions are determined or approximated in advance and stored in non-volatile memory such as ROM 122.

Figure 3:
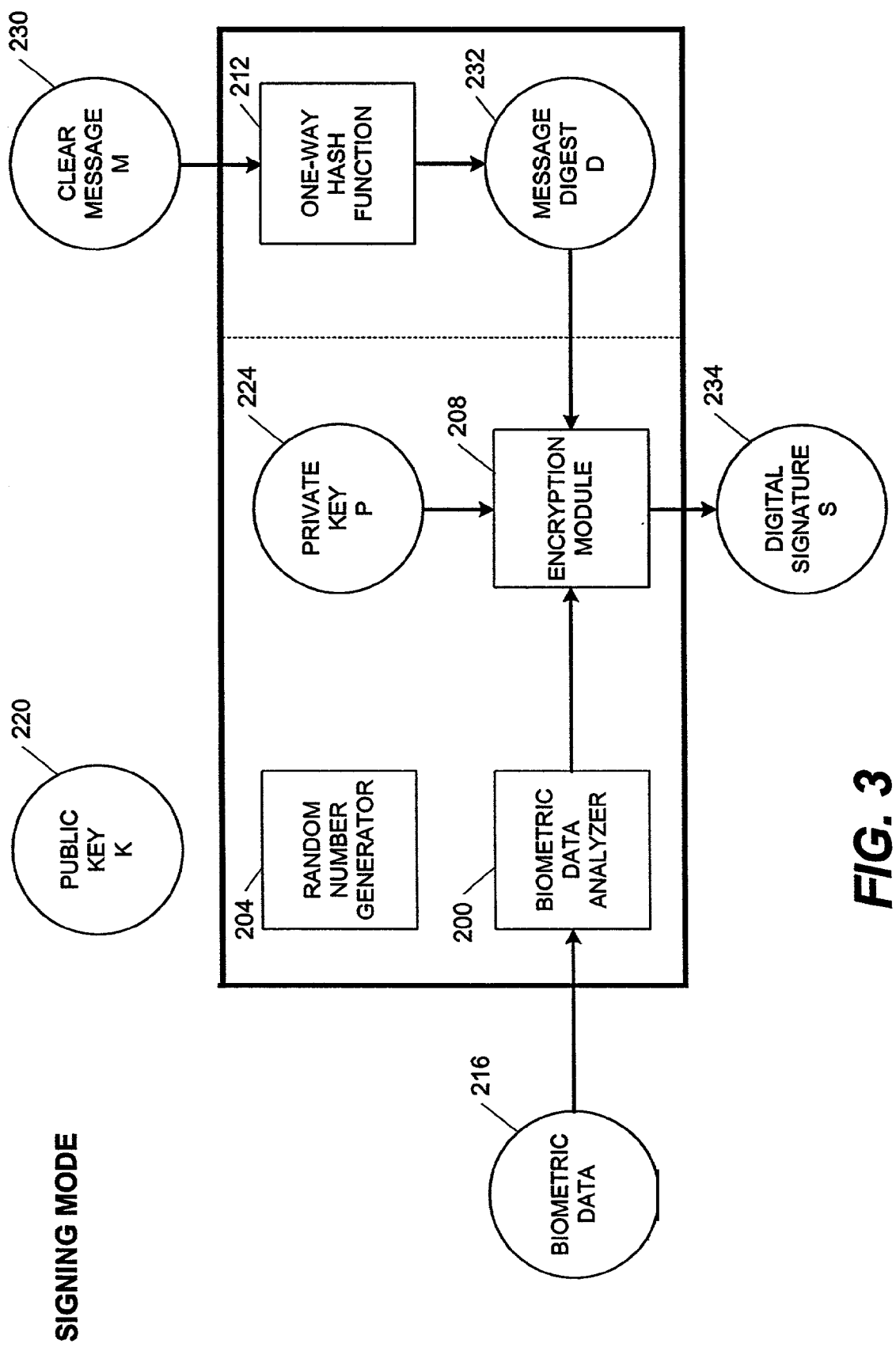
FIG. 3 is a block diagram illustrating the functional modules and data involved in a signing process that is performed by the smart card of FIG. 1.

FIG. 3 is a block diagram illustrating the process flow of the smart card 100 during a signing mode. In the signing mode, a clear message 230 is transmitted to the smart card 100 via the card reader interface 130 (FIG. 1). For authentication purposes, as is explained in further detail below, the one-way hash function 212 creates a message digest 232 based upon the content of the clear message 230. The encryption module 208 then encrypts the message digest with the private key 224 to create a digital signature 234. The digital signature 234 is then appended to the clear message 230, and is transmitted to an external device, such as a computer via the card reader interface 130.

Before any message is sent, the user must re-provide the biometric data 216 for user verification. Given an n-dimensional plot defined by a boundary function and a single point, a comparison determines whether or not the point falls below or above the function and optionally within or outside other known ranges. Stated differently, the point is analyzed to determine whether it falls within a suitable region wherein region is defined as an n-dimensional region having at least some known boundaries. When the point falls within a predetermined or suitable region, the individual is identified. When the point falls outside the predetermined or suitable region, the individual is not identified.

In another approach, actual features are computed from the measurements and combined to a vector of feature values, called a feature set. For a comparison of two biometric data only the two feature sets are compared. To compare two feature sets, each feature is compared and weighted separately. To find good weightings for this comparison can be difficult, and an artificial neural net approach may be used for this purpose. The arithmetic differences between each two corresponding features from all features of the feature sets is calculated and fed into the neural net. There they are weighted internally and an output is calculated which gives a value to be interpreted as the probability whether the two sets match. A well-trained neural net can classify not only sets used during training but also novel sets presented the first time. Once the neural net is trained and the acceptable range of output values is determined the identification can readily be made. If the output falls within this range, the individual is identified, if it is outside the range, the individual is not identified.

Although current biometric devices and algorithms based on these approaches now routinely achieve acceptable levels of false acceptance, false rejection and failure to enroll rates, a limitation of all biometric devices remain the possibility for a fraudulent user to capture and fake the input device or to access and replay the biometric data channels. To overcome this limitation, the smart card 100 converts the biometric data 216 into a digital signature 234 in a tamperproof way.

There are two types of cryptographic systems in which digital signatures have been used: symmetric and asymmetric cryptosystems. In symmetric (conventional) cryptography the sender and recipient of a communication share a secret key. This key is used by the sender, the originator of a communication, to encrypt the message and by the recipient of the communication to decrypt the message. It may also be used by the recipient to authenticate a message by having the sender use the secret key to compute some function such as a Message Authentication Code (MAC) based upon the message; the recipient thus can be assured of the identity of the originator, because only the sender and the recipient know the secret key used to compute the MAC. DES is an example of a symmetric cryptosystem.

In asymmetric (public key) cryptography different keys are used to encrypt and decrypt a message. Each user is associated with a pair of keys. One key (the public key) is publicly known and is used to encrypt messages destined for that user, and the other key (the private key) is known only to that user and is used to decrypt incoming messages. Since the public key need not be kept secret, it is no longer necessary to secretly convey a shared encryption key between communicating parties prior to exchanging confidential traffic or authenticating messages. RSA is the most well known asymmetric algorithm.

A digital signature, however, is a block of data appended to a message data unit, and allows the recipient to prove the origin of the message data unit and to protect it against forgery. Some asymmetric algorithms, e.g., RSA, can also provide authentication and non-repudiation through use of digital signatures. In order to sign data, the sender encrypts the data under his own private key. In order to validate the data, the recipient decrypts it with the sender's public key. If the message is successfully decrypted using the sender's public key, the message must originally have been encrypted by the sender, because the sender is the only entity that knows the corresponding private key. Using this method of signing documents, the encrypted message is bound to the signature, because the recipient cannot verify the message without decrypting the signature data block. The signature-encrypted message can then be encrypted to the recipient using the recipient's public key, as usual.

Digital signatures may also be formed using asymmetric encryption. To sign a message, the message is first digested (hashed) into a single block using a one-way hash function. Briefly, a typical one-way hash function, denoted H(M), operates on an arbitrary-length block of text or message M. The one-way hash function returns a fixed-length hash value, h, such that h=H(M), were h is of length m. One-way hash functions have special characteristics that make them one-way. Given M, for example, it is easy to compute h. Given h, it is hard to reverse the hashing process and to compute M such that H(M)=h. Further, it is very difficult to find another message, M', such that H(M)=H(M'). In essence, a one-way hash function has the property that, given the digest, it is computationally extremely difficult to construct any message that hashes to that value or to find two messages that hash to the same digest. The digest is then encrypted with the user's private key, and the result is appended to the encrypted or unencrypted message as its signature. The recipient uses the sender's public key to decrypt the signature into the hash digest. The recipient also digests (hashes) the message, which has been received either unencrypted or encrypted and then decrypted by the recipient, into a block using the same one-way hash function used by the sender. The recipient then verifies the sender's signature by checking that the decrypted hash digest is the same as the hashed message digest.

Separating the signature from the message in this way, i.e., not requiring the sender and recipient to encrypt and decrypt the entire message in order to verify the signature, greatly reduces the amount of data to be encrypted. This can be advantageous because public key algorithms are generally substantially slower than conventional algorithms, and processing the entire message in order to verify a signature requires a significant amount of time. The signature process also introduces redundancy into the message, which, because the message must hash to the specified digest, allows the recipient to detect unauthorized changes to the message.

A digital signature provides the security services of (a) integrity, because any modification of the data being signed will result in a different digest and thus a different signature; (b) origin authentication, because only the holder of the private key corresponding to the public key used for validation of the signature could have signed the message; and (c) non-repudiation, as irrevocable proof to a third party that only the signer, and not the recipient or its employees, could have created the signature. A symmetric secret key authenticator does not provide these services, since either of the two parties can create the authenticator using their shared key. The digital signatures can thereafter be used in a cryptographic system for enforcing security policies and authorization requirements in a manner that reduces risks to the users.

The biometrics processor 114, the CPU 118, and the cryptosystem processor 138, may be any suitable central processing unit for executing commands and controlling the smart card 100. The RAM portion of the RAM/ROM 122 serves as storage for calculated results and as stack memory. The ROM portion of the RAM/ROM 122 stores the operating system, fixed data, standard routines, and look up tables. Non-volatile memory (such as EPROM or EEPROM), e.g., EEPROM 134, serves to store information that must not be lost when the card is disconnected from a power source but that must also be alterable to accommodate data specific to individual cards or any changes possible over the card lifetime. This information can include the private key 224 and biometric measurement templates and can include the public key 220, a card serial number, a personal identification number, biometric standards or limits, authorization limits, etc. The encryption module 208 is used for performing a variety of encryption algorithms. The random number generator 204 is used to generate random keys used in the encryption algorithms. The biometrics interface 110 (FIG. 1) is used to receive biometric data. By way of example the biometrics interface 110 may provide a contact device or an optical device to perform a finger scan or image, an iris scan or image, a retina scan or image or to determine the geometry of a hand or a face. The biometrics interface may also provide a microphone to perform a voice or speaker analysis and verification. The biometrics interface may also provide a keyboard to perform key stroke dynamic analysis or a contact to perform stroke or writing dynamic analysis and verification. The biometric data analyzer 200 is used for performing various biometric data analysis, identification and verification algorithms. The card reader interface 130 includes the software and hardware necessary for communication with the outside world. A wide variety of interfaces are possible. By way of example, the card reader interface 130 may provide a contact interface, a close-coupled interface, a remote-coupled interface, or a variety of other interfaces. With a contact interface, signals from the card are routed to a number of metal contacts on the outside of the card which come in physical contact with similar contacts of a card reader device. Depending on the application, the biometrics interface 110 can be separated from or combined with the card reader interface 130.

In one embodiment, the smart card 100 includes components to perform the functions of biometric data analysis, random key generation, one-way hash function to generate a message digest, and encryption using a private key to generate a cipher text from a clear text.

The smart card 100 can be used to add a cipher hash digest to a message sent by the user. The hash digest is encrypted with a private key which is randomly generated by the card when the biometrics registration process performed by the card is complete.

The generation of random private and public keys can utilize well known algorithms and calculations to create the public and private keys. In the case of RSA, the encryption operation selects two prime numbers p and q and an exponent e which is relatively prime to (p−1)(q−1). The private key is the composite number n=p*q and the exponent e. To speed up the RSA algorithm, three common choices for e are 3, 17 and 65537.

The public key is the composite number n and the exponent d, so that e*d is congruent to 1 modulo (p−1)(q−1). The calculation of d is straightforward using the extended Euclidian algorithm.

A simple algorithm to generate the public and the private key on the card module runs as follows: first generate two large random prime numbers p and q and choose e among 3, 17 and 65537 so that e is relatively prime to (p−1)(q−1); if not possible repeat the random prime numbers generation until two suitable primes are found; then calculate n and d. The generation of the two random prime numbers p and q can be achieved by using standard algorithms to generate probable primes with an acceptable very low probability of error, such as the Miller-Rabin algorithm, or provable primes, such as the Maurer's algorithm.

Various other algorithms are currently used for efficient asymmetric cryptography. In the Rabin algorithm one has to choose first two primes p and q congruent to 3 modulo 4. These primes are the private key, the product n=p*q is the public key.

In the ElGamal algorithm to generate a key pair, one has to choose a prime p and two random numbers g and x such that both numbers g and x are less than p. The private key is x, the public key is g exp x modulo p, g and p.

It is clear that in all these cases the private and public keys can be generated by the cryptosystem processor 138 by generating random integers and prime numbers and performing relatively simple and rapid tests and calculations.

The advantage of this approach is that nobody, even the user, is able to know the private key 224. The private key 224 is generated only when the biometric template data for the biometric registration is complete. The private key 224 is be embedded into tamperproof portion of the smart card 100 and is therefore inaccessible to any outside user.

The public key 220 is usually transmitted with a digital certificate. A digital certificate is a data package that completely identifies an individual and is issued by a certification authority only after that authority has verified the individual's identity. The data package includes the public key that belongs to the individual. When the sender of a message signs the message with his private key, the recipient of the message can use the sender's public key (retrieved from the certificate either sent with the message or available elsewhere on the network) to verify that the sender is legitimate. A certificate can also be used to send an encrypted message to the certificate owner by using the public key contained in the certificate.

The public key 220 generated by the smart card 100 can be used to generate a digital certificate by a certification authority. For example every smart card can be identified by a serial number. The certification authority can maintain records identifying which smart card 100 has been attributed to which individual and receive the public key corresponding to said smart card and said associated user upon the biometrics registration process.

As an example, The X.509 protocol defines the following structure for public-key certificates, and can be used directly with the smart card data:

Version
Serial Number
Signature Algorithm
Issuer Name
Period of Validity
   1. Not Before Date
   2. Not After Date
Subject Name
Subject's Public Key
   Algorithm
   Public Key
Extensions
Signature The version field identifies the certificate format. The serial number is unique to the smart card 100. The signature algorithm identifies the algorithm used to sign the certificate. The issuer field contains the name of the certification authority. The period of validity field includes a pair of dates that identifies the period of time that the certificate is valid. The subject field stores the name of the user to whom the certificate is issued. The subject's public key field includes the algorithm name and the public key itself. The last field contains the certification authority's signature.

In one embodiment of the invention, generation of the digital signature requires the combination of receipt of individual specific biometric data and the card specific private key. No one, even the user or the card manufacturer, is able to produce a second card generating the same private key. The smart card 100 is unique and specific to the user.

One of the advantages of the smart card 100 is that it safeguards against forgery in case of loss of the card or attempts to duplicate the smart card 100. First, the smart card 100 is useless without its user. Second, the duplication of the smart card 100, even with the knowledge of the user's biometric data does not allow the generation of the same private key and the same signature. Only the combination of the unique smart card and its corresponding specific accurate biometric data allows the generation of the digital signature.

The device provides for a novel way to generate a digital signature, which is unique, cannot be duplicated, even by the user or the manufacturer, and requires the user's specific biometric data in all cases. By requiring the physical presence of the individual and the device to generate the digital signature it provides for a contextual control of the signature, which is equivalent or even superior in many ways to controls currently applied on physical or biological signatures and used in today's legal and administrative world.

Figure 4:
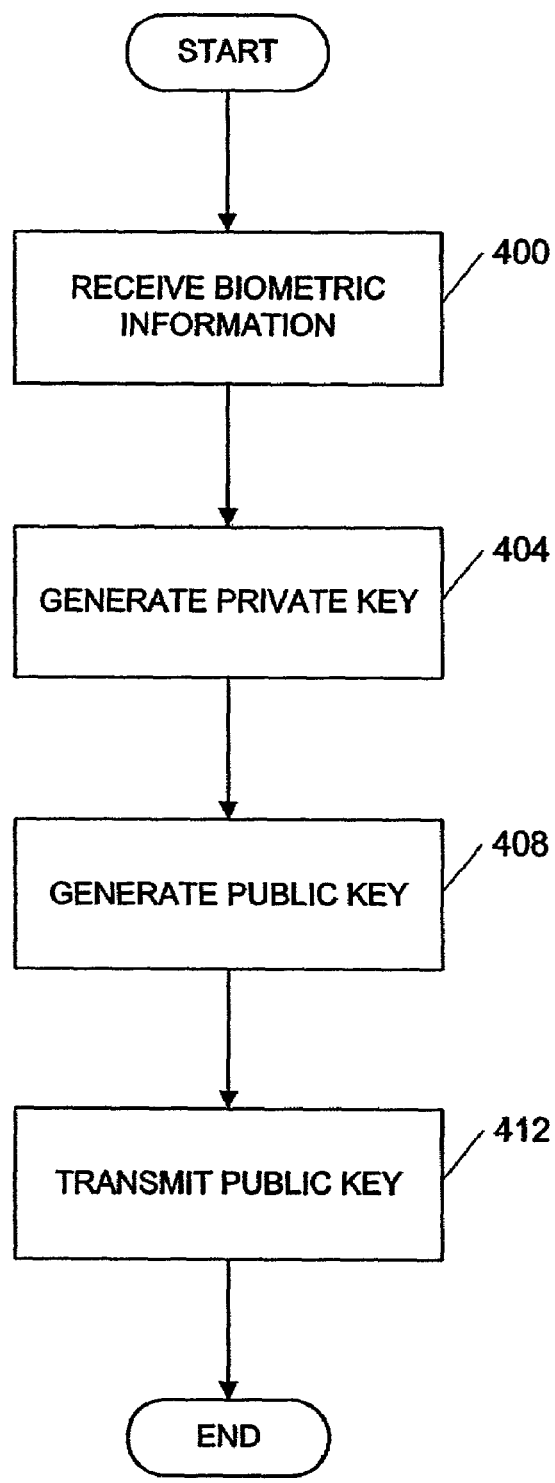
FIG. 4 is a flowchart illustrating an exemplary process of registering biometric information with the portable encryption device of FIG. 1.
Figure 5:
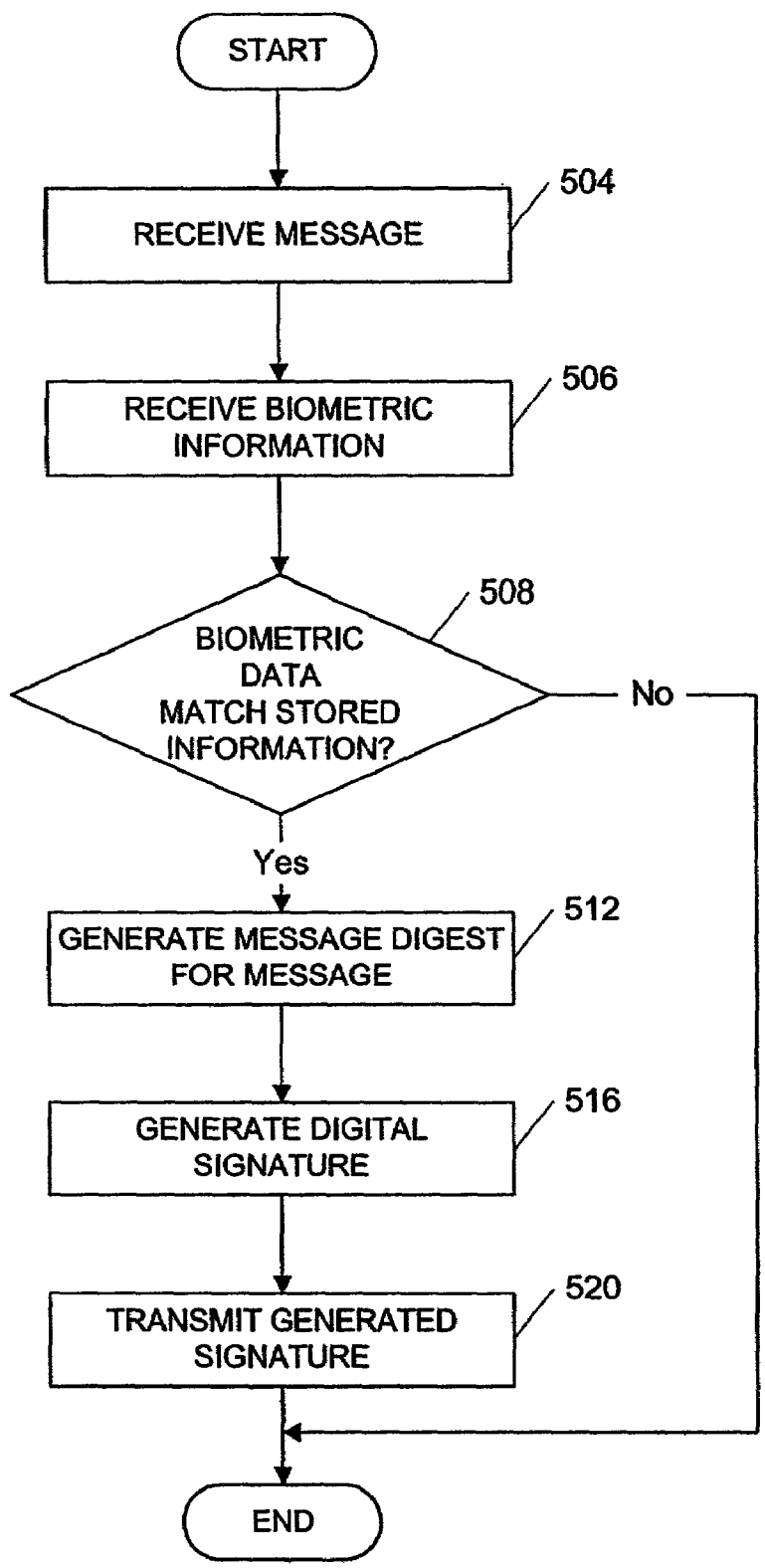
FIG. 5 is a flowchart illustrating an exemplary process of generating and authenticating a message using the portable encryption device of FIG. 1.

A device according to the present invention utilizes a biometrics authentication procedure to generate a digital signature. In the disclosed embodiment of the invention, the token or smart card is used in two different ways, i.e., in an enrollment mode or in a signing mode. FIG. 4 is a flowchart illustrating an exemplary process of registering biometric information received from a user in the enrollment mode. FIG. 5 is a flowchart illustrating an exemplary process of authenticating a messaging in the signing mode. It is to be appreciated that depending on the embodiment, additional states may be added, others removed, and the ordering of the states may be rearranged.

Referring to FIG. 4, at a state 400, in the "enrollment" or "registration" mode the smart card 100 uses the biometrics data analyzer 200 to register biometrics templates coming through the biometrics interface 110. Next, at a state 404, after completion of the biometrics registration procedure, the smart card 100 generates, via the random key generation module 204, the private key 224. Moving to a state 408, the smart card 100 generates the public key 220. The private key 224 is stored in the card non-volatile memory, such as EEPROM 134, and remains unknown to the user, whereas the public key 220 is communicated to the user and his correspondents through the card reader interface 130 and any subsequent communication channel.

Continuing to a state 412, the public key 220 can be provided to the correspondents by a certification authority along with a digital certificate. The certification authority assigns to the smart card 100 a specific serial number that is specific to an individual and certifies the corresponding public key 220 after successful enrollment by the individual.

Referring now to FIG. 5, at a state 504, in the "signing" mode a message 230 is downloaded from a computer into the smart card 100 through the card interface 130 and processed with the one-way hash function 212 to generate a message digest D=H(M). Next, at a state 506, biometric measurements are taken again from the biometrics interface 110 and verified by the biometric data analyzer 200. It is to be appreciated that the biometric information may optionally be received concurrently with or before the receipt of the message.

Continuing to a decision state 508, if the biometric data 216 is identified (and the identity of the user is authenticated), the process proceeds to a state 512, wherein a message digest for the message is created. Otherwise, if the biometric data 216 is not identified, the process ends.

From state 512, the process proceeds to a state 516 wherein the message digest is encrypted by the encryption module 208 on the card 100 using the private key 224. The result is an encrypted message digest that is the digital signature 234 for the message 230. This digital signature 234 is added to the message 230. Proceeding to a state 520, the message is sent back to a computer for further processing and communication.

In order for the process to be secure it is recommended that the biometric data analyzer 200, the random number generator 204, the private key 224 and the encryption module 208 be embedded into the card in a tamperproof way. The fact that the private key 224 is inaccessible provides security to the system. The one-way hash function 212 and the public key 220 are shared with the recipients of the message in order to decrypt the signature and to compare the message digest with the decrypted signature, accordingly it is not necessary to have the one-way hash function 212 nor the message digest 232 be embedded into the smart card 100. However, depending on the application considered, it might be preferable to generate the message digest on the smart card 100. For example, the smart card 100 could also be used to verify other user's signatures, in which case it will be convenient to store the one way hash function 212 in the smart card 100 to be able to verify and create message digests. Incorporating the biometric data analyzer 200 into the smart card 100 is advantageous because it provides for an additional level of security. Any attempt to simulate the biometric data is extremely difficult because the details of the biometric data and the analysis algorithms are embedded into the smart card 100 and are unknown to a fraudulent user.

The digital signature can be added to any message or any electronic document. The use of the smart card 100 opens a vast area of applications ranging from electronic signatures on bilateral and multilateral transactions, electronic notary services, electronic authorizations for financial transactions in banking and trading, payments for electronic commerce, payments for electronic auctions, payments for access to electronic services, and more generally all activities requiring the identification of a user requesting or performing an electronic transaction.

By using the random key generator 204 and the encryption module 208, the private key 224 does not need to be stored in a host computer. Further, the user biometrics verification process is advantageous due to the fact that if the smart card 100 is stolen, it is of little value. The user and the device are required to generate the digital signature.

While the above detailed description has shown, described, and pointed out novel features of the invention as applied to various embodiments, it will be understood that various omissions, substitutions, and changes in the form and details of the device or process illustrated may be made by those skilled in the art without departing from the scope of the invention. The scope of the invention is indicated by the appended claims rather than by the foregoing description. All changes which come within the meaning and range of equivalency of the claims are to be embraced within their scope.

The invention claimed is:

1. A method of generating a digital signature on a single secure and portable device, comprising:

receiving, during an enrollment mode of said secure and portable device, biometric information indicative of a user in said secure and portable device;

storing the received biometric information;

generating, subsequent to receiving the biometric information, during the enrollment mode, and based at least in part upon one random number, a public key in said secure and portable device;

generating subsequent to receiving the biometric information, during the enrollment mode, and based at least in part upon one random number, a private key in said secure and portable device;

storing, during the enrollment mode, the private key in a tamperproof memory in said secure and portable device;

receiving a message for encryption by said secure and portable device;

receiving biometric information indicative of the user at said secure and portable device, the received biometric metric information being provided so to authenticate the identity of the user;

comparing the stored biometric information with the received biometric information on said secure and portable device, and if the comparison is successful, generating a digital signature for a message, wherein the digital signature includes an encrypted message digest of the message, and wherein the digital signature is encrypted, at least in part, using the generated private key.

transmitting the generated digital signature and the received message to a remote electronic device.

2. The method of claim 1, where said secure and portable device is a smart card.

3. A single secure and portable device, comprising:

a processor configured to receive and store, during an enrollment mode of said secure and portable device, biometric information indicative of a user in said secure and portable device, and a biometric interface for receiving the biometric information and transmitting the biometric information to the processor; and wherein the processor is configured to generate, subsequent to the processor receiving and storing the biometric information, and based at least in part upon one random number, a private key and a public key in said secure and portable device; and wherein subsequent to the enrollment mode, the processor is configured to receive biometric information indicative of the user at said secure and portable device compare the stored biometric information with the received biometric information being provided so to authenticate the identity of the user, and if the comparison is successful, generate a digital signature for a message; wherein the digital signature includes an encrypted message digest of the message, and wherein the digital signature is encrypted, at least in part, using the generated private key; and wherein said secure and portable device is configured to transmit the generated digital signature to a remote electronic device.

4. The device of claim 3, where said secure and portable device is a smart card.

* * * * *